Nov. 8, 1955   J. F. THOMAS   2,722,822
HUB CAP LOCK FOR WHEELS
Filed Dec. 11, 1953
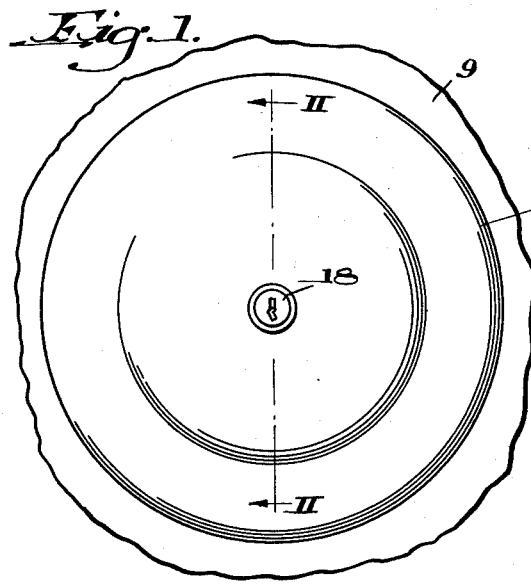
Fig. 1.
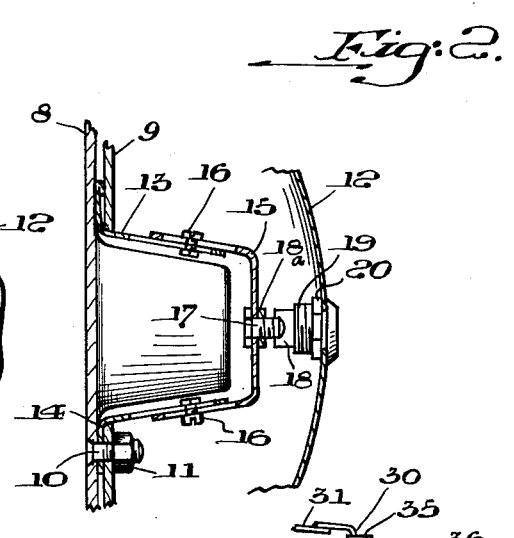
Fig. 2.
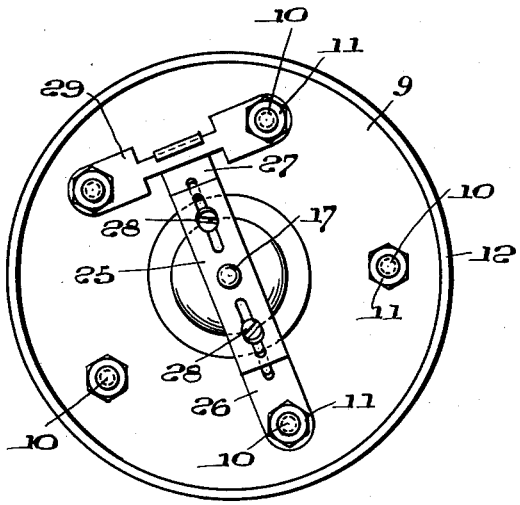
Fig. 3.
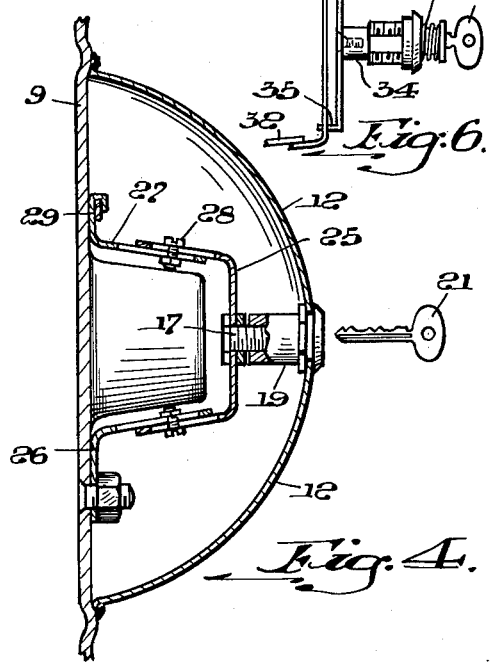
Fig. 6.
Fig. 4.
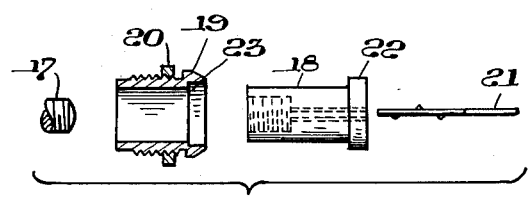
Fig. 5.
INVENTOR.
JOHN FRANCIS THOMAS
BY Archworth Martin
his ATTORNEY.

United States Patent Office 2,722,822
Patented Nov. 8, 1955

2,722,822

HUB CAP LOCK FOR WHEELS

John Francis Thomas, Pittsburgh, Pa., assignor of eighteen per cent to Archworth Martin, Pittsburgh, Pa.

Application December 11, 1953, Serial No. 397,511

2 Claims. (Cl. 70—167)

My invention relates to disc cap locks for motor vehicle wheels, that not only will prevent theft of the ornamental hub caps but also prevent theft of the wheel itself and of the tire.

Among the objects of my invention are: to provide a locking assembly that can readily be applied to various types of automobile wheels without the necessity of using high mechanical skill; wherein a locking element that is carried by the cap itself can be more readily aligned or matched up with the locking element that is secured to the wheel, and wherein the hub cap can be used without the lock, when desired, a lock cylinder of the assembly, which holds the cap in place, being readily removable from the cap and the other locking elements.

In the accompanying drawing,

Figure 1 is a face view of a portion of a wheel showing my locking device at the center of the hub cap;

Fig. 2 is a view taken on the line II—II of Fig. 1;

Fig. 3 is a face view showing a modification of the elements of Fig. 2, with the hub cap omitted;

Fig. 4 is a sectional view, on an enlarged scale, of the structure of Fig. 3;

Fig. 5 shows various of the locking elements of Figs. 1 to 4, in disassembled position, and Fig. 6 shows a modification of the structures of Figs. 2 and 3.

Referring first to Figs. 1, 2 and 5, a portion of a conventional brake drum is indicated by the numeral 8 and the disc portion or body of a wheel is indicated by the numeral 9. The usual bolts 10 and nuts 11 are provided for connecting the wheel 9 to the brake drum 8. A hub cap 12 is detachably connected to the wheel disc 9 in any one of well known ways, usually by snap fit.

To prevent unauthorized removal of the disc 12, I provide a locking device that comprises a bracket having end portions 13 and 14 and a yoke-like mid portion 15 that is adjustably connected to the end portions by the bolts 16, to suit cars of various makes.

One of the bolts 10 extends through the end portion 14 of the bracket and the upwardly-extending flange of the bracket member 13 is disposed between the wheel disc 9 and the brake drum 8 at a point between the upper bolts 10. A stud-like keeper 17 is tightly clamped to the bracket member 15 by a nut 18a.

The keeper stud 17 is threaded for connection to an interiorly-threaded lock barrel 18 that extends through a lock cylinder 19 which serves as a bushing for a hole through the center of the hub cap 12 and is tightly held therein by a clamping nut 20. The cylinder 19 and the barrel 18 may suitably be of one of well known lock cylinder types operated by a key 21. The lock barrel 18 has a shoulder 22 formed thereon for abutting engagement with a recessed shoulder 23 in the lock cylinder 19 when the threads in the barrel 18 are interengaged with the threads of the keeper studs 17. The cap 12 can therefore not be removed until the key 21 is employed to remove the barrel 18 from the stud 17.

When the barrel is in unlocked and retracted position, there is clearance between it and the keeper stud, so that the cap can be re-applied in the usual manner, without obstruction or interference by any of the locking elements.

An important feature of my invention is the arrangement that permits complete removal of the lock barrel from the hub cap. This serves to allow axial alignment of the stud with the hole through the cylinder 19 by a screw driver or other tool inserted through the cylinder 19, in case the stud 17 is out of alignment with the axis of the cylinder 19, and it also permits placing of the hub cap 12 in its normally applied position, in case of damage to or loss of some of the locking elements.

Referring now to Figs. 3 and 4, I show a bracket of somewhat different form than the bracket elements 13—14—15 of Fig. 2. In this case, a yoke-like bracket member 25 is adjustably connected to bracket members 26 and 27 by bolts 28. The bracket arm 26 is held in place by one of the bolts 10 and its nut 11 while the bracket arm 27 extends under a strap 29 and has hooked engagement therewith, the strap 29 being held in place by two other bolts 10 and their nuts. The lock members of Fig. 5 will be used with this arrangement in the same manner as in the case of Fig. 2.

Referring now to Fig. 6, I show an arrangement wherein a yoke-like bracket member 30 corresponds to the yoke 15 or 25 and is connected to arms 31 and 32 as are the arms 13 and 14 or the arms 26 and 27 to their yokes. In this case, a locking bar 33 is rigidly mounted on a rotor 34 and has hooked ends 35 that can be moved into hooked engagement with the edges of bracket member 30 when the key 21 and its lock barrel are pushed inwardly against a spring 36, to engage the locking bar 33 with the bracket and turned. When the device is unlocked, the barrel is pushed outwardly by the spring, to leave clearance between the lock and the bracket, so that the cap can always be replaced in the usual manner, without interference by the fastening devices.

I claim as my invention:

1. Locking apparatus for removably connecting a disc-like member to a retaining member, comprising a lock cylinder extending through the disc member and having a flange on its outer end engageable with the outer face of the disc, a clamping nut having threaded engagement with the periphery of the cylinder and cooperating with the flange, to rigidly clamp the cylinder to the disc, a lock barrel rotatable in the cylinder by a key and internally-threaded at its inner end, a threaded stud carried by the retaining member in co-axial alignment with the barrel and in position for threaded engagement with the barrel thread, the barrel being freely rotatable thereon, and a shoulder on the outer end of the barrel engageable with the outer end of the cylinder, the barrel being removable from the cylinder when out of threaded engagement with the said stud.

2. Locking apparatus as recited in claim 1, wherein the retaining member is disposed in crosswise relation to the axis of the lock barrel and has the threaded stud mounted on its mid portion.

References Cited in the file of this patent

UNITED STATES PATENTS

| 174,846 | Parker | Mar. 14, 1876 |
| 1,134,305 | Wiesner | Apr. 6, 1915 |
| 1,968,506 | Schneider | July 31, 1934 |
| 2,073,851 | Powell | Mar. 16, 1937 |
| 2,594,407 | Earnest | Apr. 29, 1952 |

FOREIGN PATENTS

| 653,816 | France | Nov. 19, 1928 |